US005784266A

United States Patent [19]
Chen

[11] Patent Number: 5,784,266
[45] Date of Patent: Jul. 21, 1998

[54] SINGLE MAGNETIC LOW LOSS HIGH FREQUENCY CONVERTER

[75] Inventor: Wei Chen, Blacksburg, Va.

[73] Assignee: Virginia Power Technologies, Inc., Blacksburg, Va.

[21] Appl. No.: 662,238

[22] Filed: Jun. 14, 1996

[51] Int. Cl.$^6$ ................................................. H02M 3/335
[52] U.S. Cl. .............................. 363/16; 363/17; 363/20; 363/126; 363/127
[58] Field of Search ................................ 363/15, 160, 17, 363/20, 21, 126, 127

[56] References Cited

U.S. PATENT DOCUMENTS

| | | | |
|---|---|---|---|
| 4,899,271 | 2/1990 | Seiersen | 363/126 |
| 5,132,888 | 7/1992 | Lo et al. | 363/17 |
| 5,291,382 | 3/1994 | Cohen | 363/16 |
| 5,335,163 | 8/1994 | Seiersen | 363/126 |
| 5,434,768 | 7/1995 | Jitaru et al. | 363/21 |
| 5,555,494 | 9/1996 | Morris | 363/17 |
| 5,600,293 | 2/1997 | Hunter | 336/182 |

OTHER PUBLICATIONS

Balogh, "The Performance Of The Current Doubler Rectifier with Synchronous Rectification", May 1996 HFPC Proceedings pp. 216–225.

"A New Efficient High Frequency Rectifier Circuit" by Hannigan, Peng, Seiersen. HPFC Proceedings, Jun. 1991, pp. 236–243.

"Zero Voltage Switching in the PWM Half Bridge Topology With Complementary Control and Synchronous Rectification" by Garcia, Cobos, Uceda, and Sebastian. IEEE proceedings, 1995 0-7803-2730-Jun. 1995, pp. 286–291.

*Primary Examiner*—Jeffrey L. Sterrett
*Attorney, Agent, or Firm*—James W. Hiney

[57] ABSTRACT

An improved magnetically integrated power converter which are provided specifically for use with power supplies with high density requirements. The converters comprise an integrated magnetic device integrating the functions of two transformers and three inductors. The integrated magnetic device is implemented on a three-leg core with two secondary windings and one primary winding, each winding on one of the core legs. The primary winding connects to the input dc voltage source by either a forward type arrangement or a half-bridge type circuit arrangement. Each secondary winding connects to the output through a rectifier. The turns number for two secondary windings can be different in order to achieve wider input range or reduced voltage stress.

15 Claims, 16 Drawing Sheets

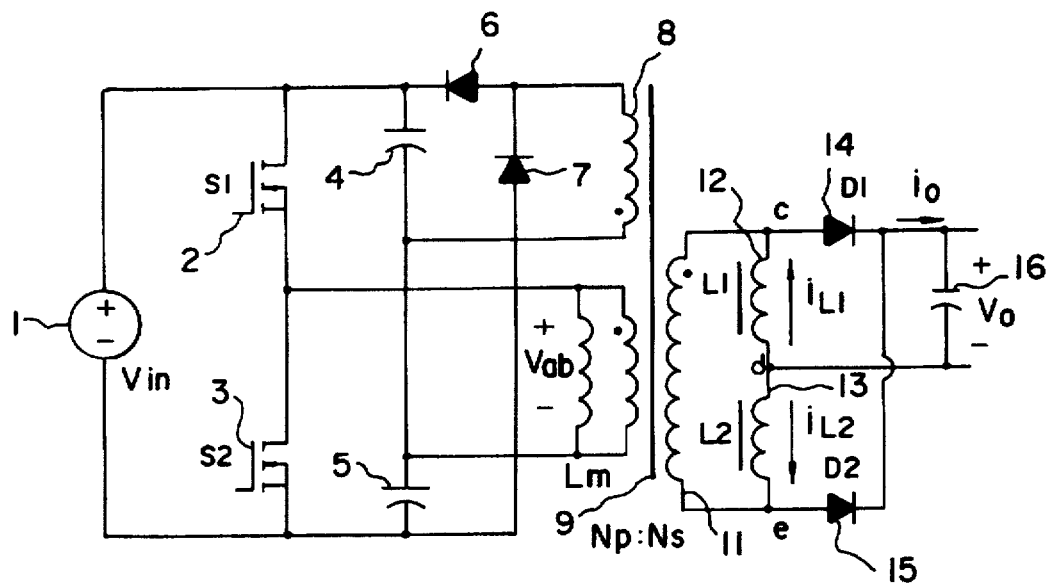
FIG. 1(a) PRIOR ART
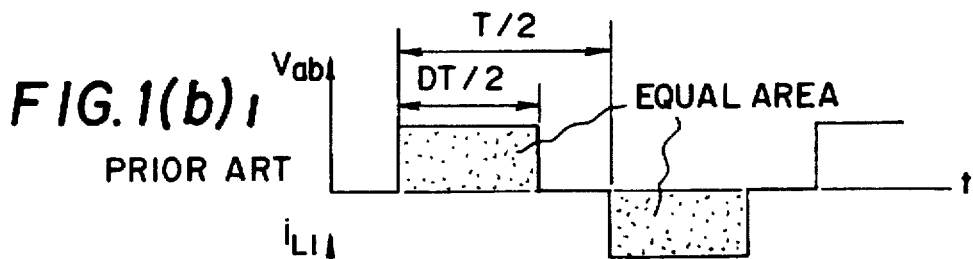
FIG.1(b)1 PRIOR ART
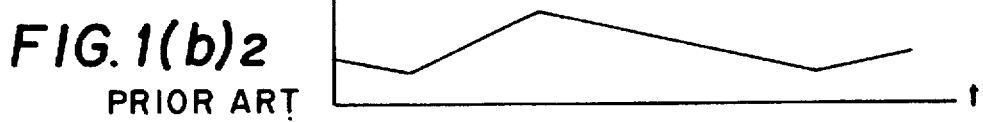
FIG.1(b)2 PRIOR ART
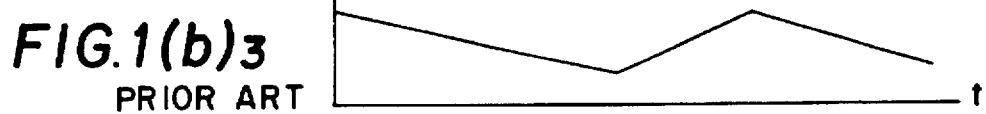
FIG.1(b)3 PRIOR ART
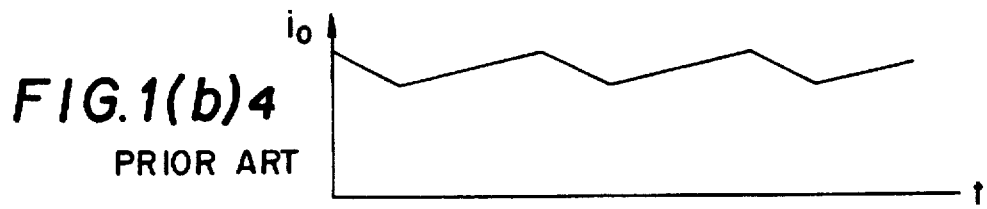
FIG.1(b)4 PRIOR ART

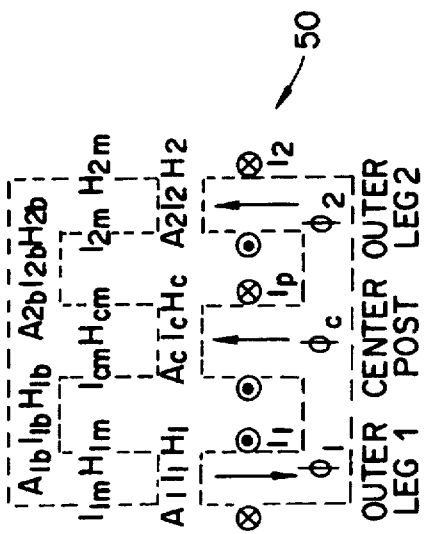
FIG. 2(a)1
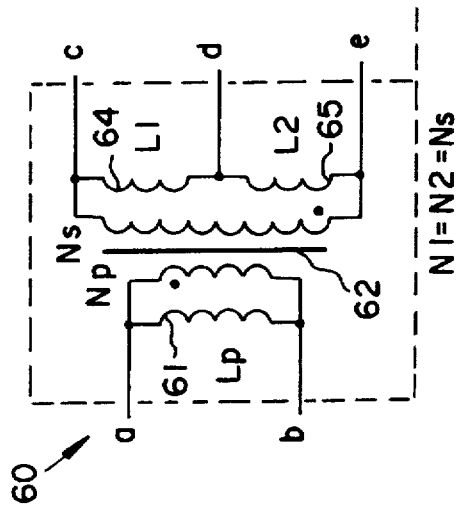
FIG. 2(a)2
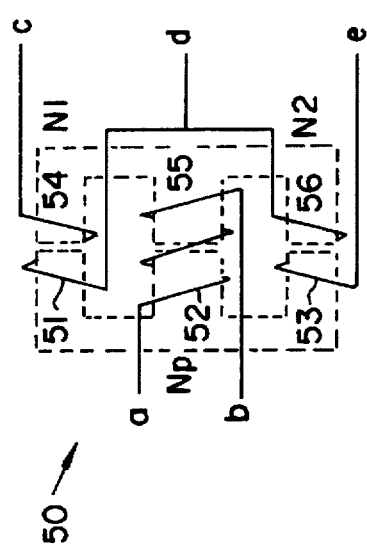
FIG. 2(b)1
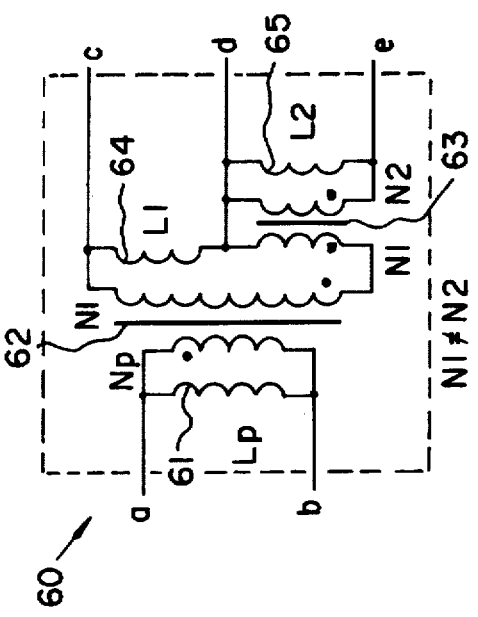
FIG. 2(b)2

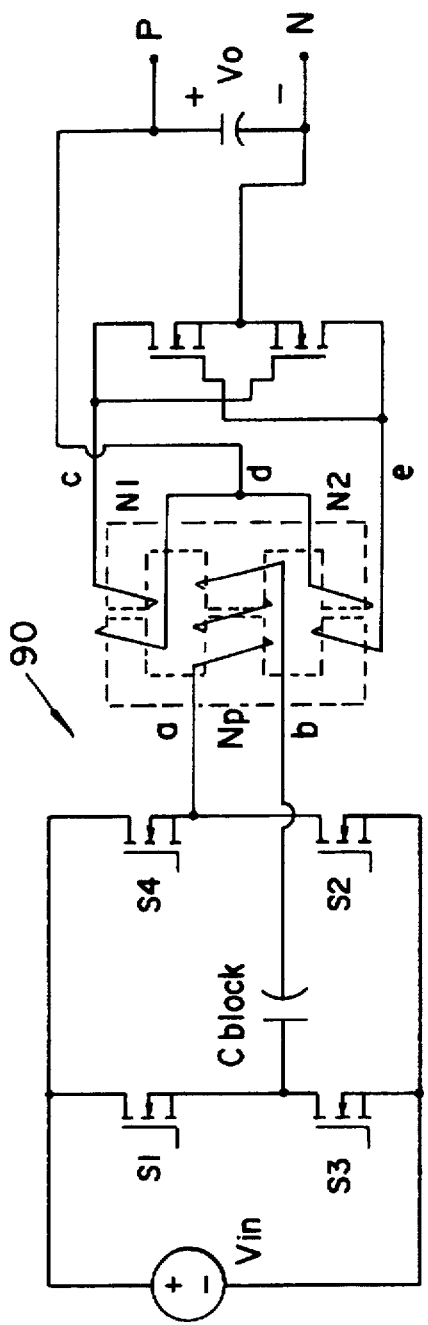
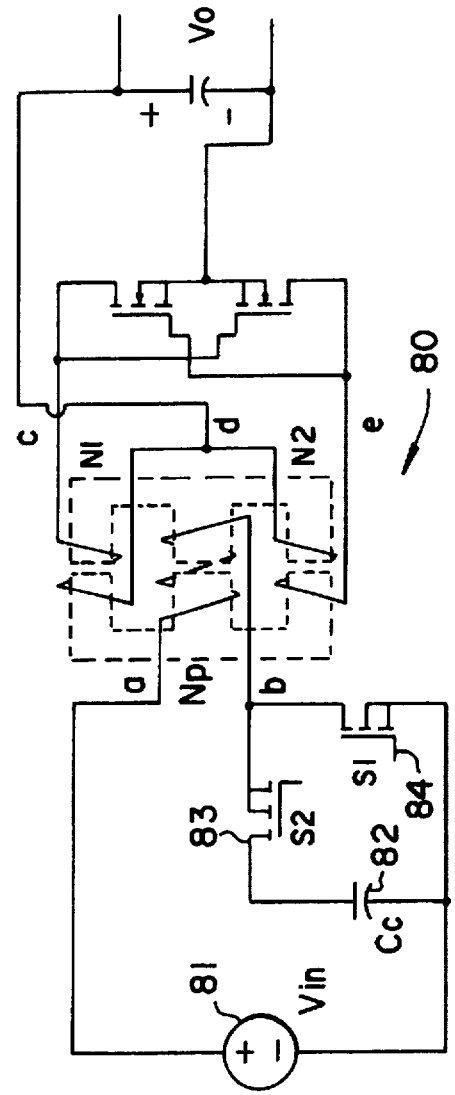
FIG. 4(c)
FIG. 4(d)

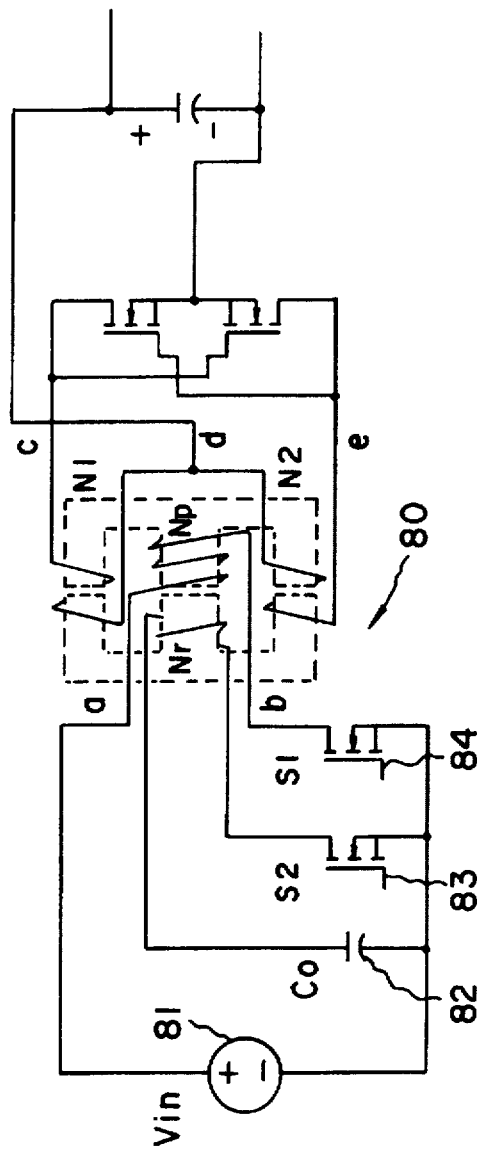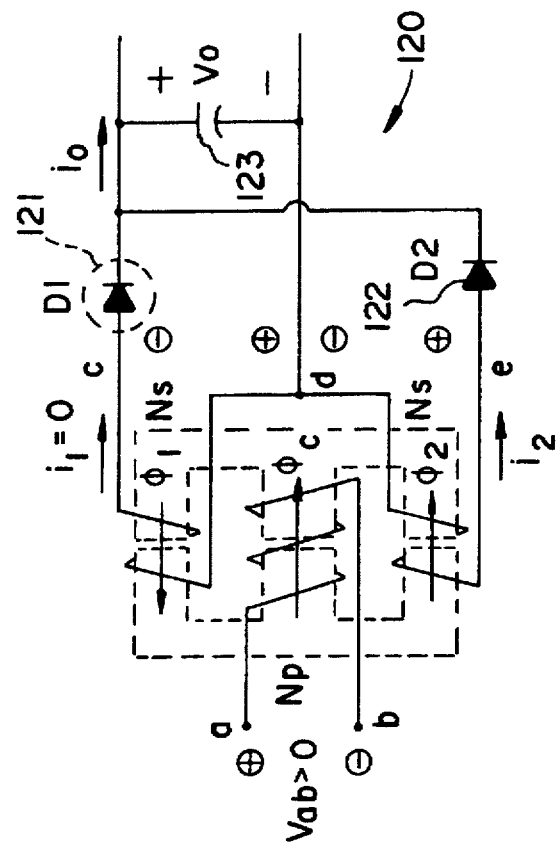
FIG. 4(e)
FIG. 5(a)

SINGLE MAGNETIC LOW LOSS HIGH FREQUENCY CONVERTER

This disclosure deals with a unique and novel approach to the problems normally associated with high frequency power conversions, namely, large size requirements and high ripple currents in the filter capacitor normally part of the converter.

BACKGROUND OF THE INVENTION

In the area of high frequency power conversions one must successfully reduce the ripple current in the filter capacitor to allow for reduction in the size of the accompanying capacitor and consequently, the overall power supply size. A typical current doubler circuit, which is often referred to as the "hybridge circuit", employs two filter inductors whose voltage waveforms are complementary and reduces, in an effective manner, the ripple current flowing through the filter capacitor circuit. The inherent disadvantage of the current doubler circuit is in its use of two inductors. Such a power circuit needs to employ three magnetic components thus increasing the cost of the system as well as causing termination power loss. In addition, there are design problems in with all those components as well as packaging problems.

The instant invention overcomes these drawbacks in a unique and innovative manner. The instant invention provides for an integrated magnetic technique allowing for an entire family of new superior converters. The instant integrated magnetic structure utilizes only one, not three, magnetic core components, preferably a three-post core, and three windings, each on one of the core posts, one winding connected to the primary-side or input side and the other two connected to the secondary-side or output side. The novel arrangement still possesses all the advantages and merits of the conventional current doubler circuit. The size of the integrated magnetic structure is only slightly larger than the conventional doubler circuit transformer as the integrated magnetic structure has one more winding than a conventional transformer. The elimination of the two inductors greatly reduces the overall size of the magnetic components. A significant advantage is realized by the innovation of providing a different number of turns of the secondary-side windings which reduces voltage stress on the device and the overall cost of the device.

BACKGROUND ART

While there have been several efforts in the past to lower the overall number of magnetic components none have proven to be as innovative and effective as the present invention.

The first effort to overcome problems solved by the instant invention was described by C. Peng, et. al. in an article published in *High Frequency Power Conference Proceedings*, 1991, pp. 236–243, wherein he proposed an integrated magnetic structure which used one central core and four windings. However, the additional secondary winding increases the termination loss and poses difficulty in circuit design planning. Furthermore, the device suggested by Peng requires the windings in the outer legs to be the same while in the instant invention they can differ by applications to reduce voltage stress.

The second approach to the problem is seen in U.S. Pat. No. 5,291,382 which discloses a system utilizing two transformers having low magnetizing inductance in an attempt to achieve low ripple current. The major problem with this approach is that it is self-defeating inasmuch as it increases the overall cost by having more magnetic components. Accordingly, termination loss is higher and the circuit design is more complicated and costly.

A third approach is seen in U.S. Pat. No. 5,434,768, especially in FIG. 22 thereof, which shows a secondary-side circuit layout configuration of an integrated magnetic structure with a single turn transformer secondary winding and inductor windings. Two layers of the secondary winding must be employed if it is to be integrated into a printed circuit board (PCB) and the overall dimensions of the magnetic component is very large. In the instant invention, by contrast, the secondary-side circuit layout with a single turn for the secondary-side windings is much simpler in operation and design. Only one layer is necessary for integrating the design into a PCB with a number of possible configurations.

SUMMARY AND OBJECTS OF THE INVENTION

The instant invention provides for a novel integrated magnetic design which allows for less termination loss, fewer magnetic components, effective reduction of the ripple current, lower overall system cost, a simple secondary layout configuration for low voltage, high current applications, and reduced voltage stress by the use of different turns on outer leg windings.

Accordingly, it is an object of this invention to provide for an improved high density power converter which has fewer magnetic components than conventional converters.

It is a further object of this invention to provide a simplified high density power converter which allows for easy layout design and packaging.

A further object of this invention is to provide an improved high density power converter which produces reduced voltage stress of the semiconductor devices forming part of said converter by the use of different winding turns on the secondary-side windings.

A still further object of this invention is to provide a simple secondary layout configuration in a high density power converter for low voltage high current applications.

It is yet another object of this invention to provide a high density power converter which results in low ripple current and a small filter size to improve the power density of the converter.

These and other objects of the invention will become apparent when reference is had to the accompanying specification and drawings.

BRIEF DESCRIPTION OF THE DRAWINGS

FIG. 1(a) depicts the background art conventional half-bridge current doubler circuit.

FIG. 1(b) depicts the typical waveforms of the conventional half-bridge doubler circuit of FIG. 1(a).

3

Figure 2C:
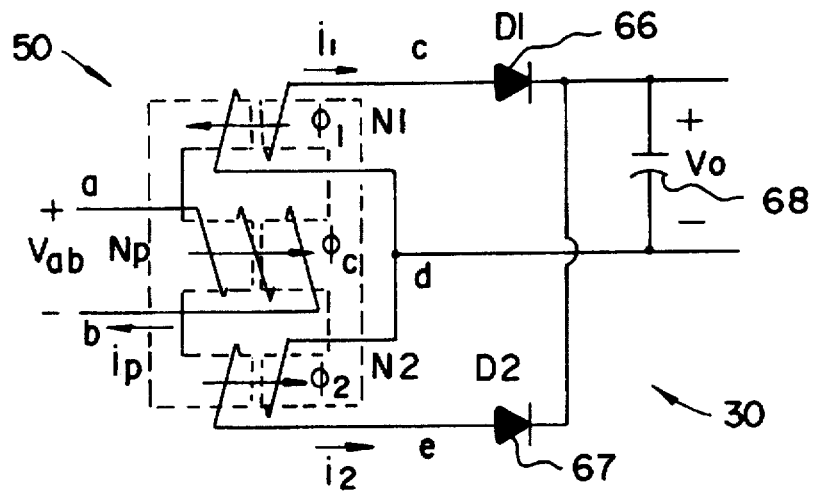
FIG. 2(c) shows the new rectifier circuit for the new structure.
Figure 2D:
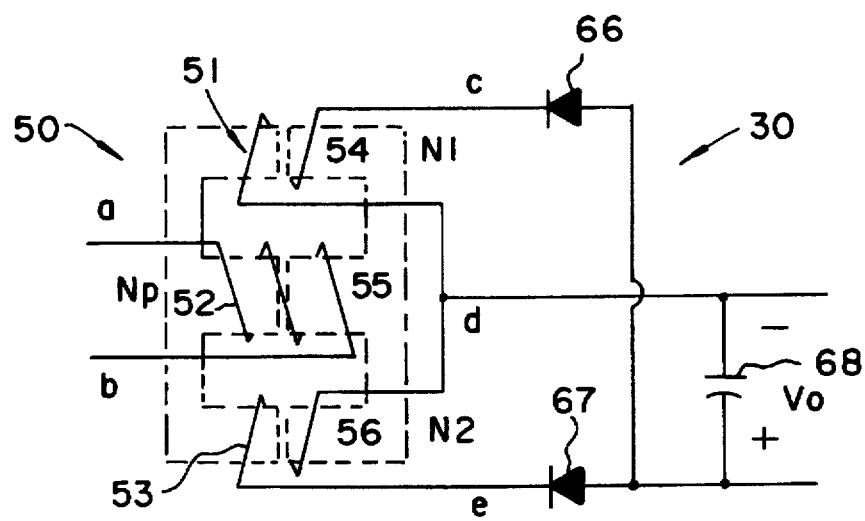
FIG. 2(a) shows a diagrammatic view of the new integrated magnetic structure.
FIG. 2(b) illustrates the equivalent electrical circuit of the structure in FIG. 2(a).

FIG. 2(d) shows another configuration of the new rectifier circuit for the new structure.

Figure 2E:
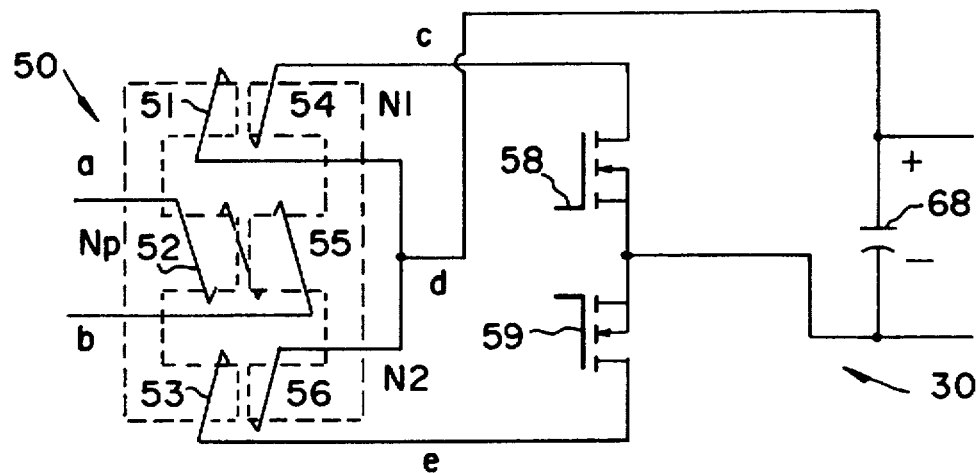

FIG. 2(e) shows the new rectifier circuit for the new structure employing transistors as the synchronous rectifiers.

Figure 2F:
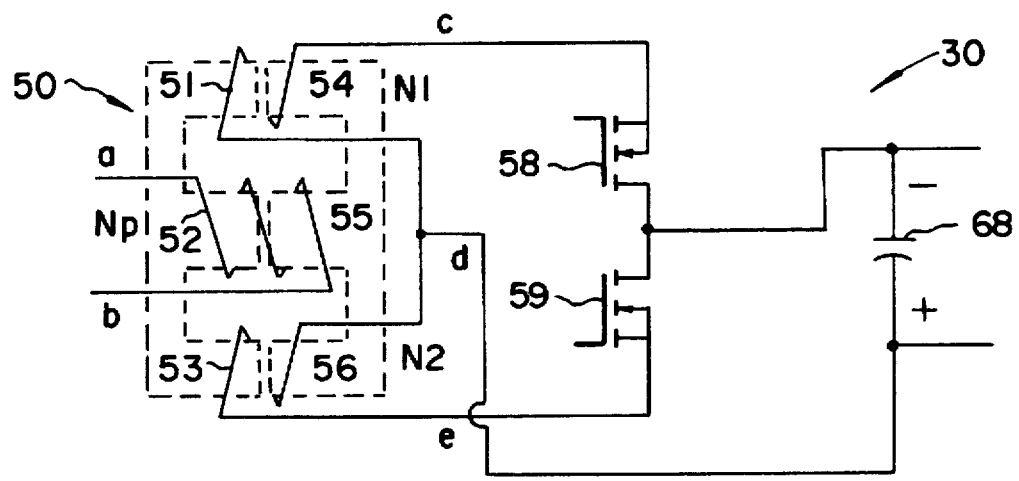

FIG. 2(f) shows another configuration of the new rectifier circuit for the new structure employing FET transistors as the synchronous rectifiers.

Figure 2G:
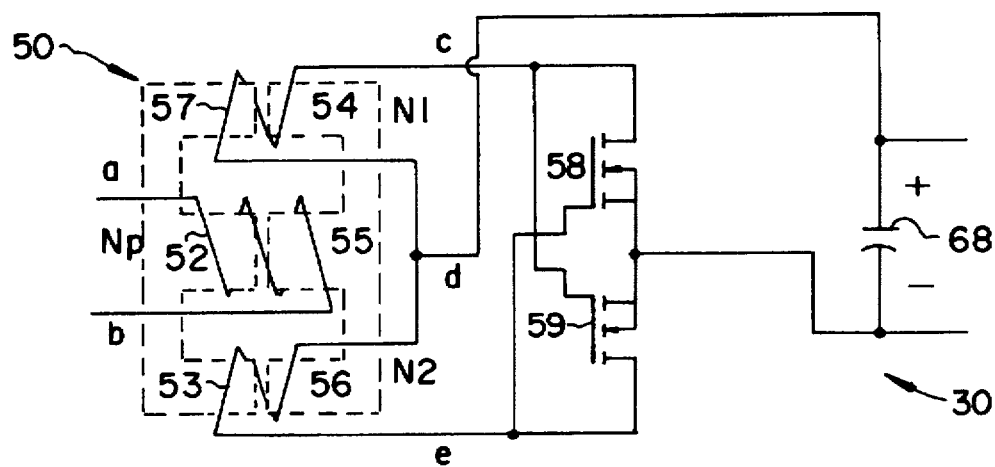

FIG. 2(g) shows the new rectifier circuit employing self-driven synchronous rectifiers (SSRs).

Figure 3A:
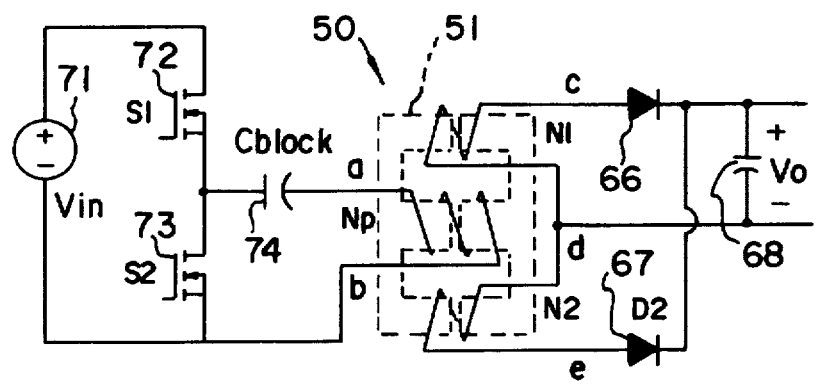

FIG. 3(a) is a diagrammatic view of the application of the new integrated magnetic structure on a half-bridge derived converter.

Figure 3B:
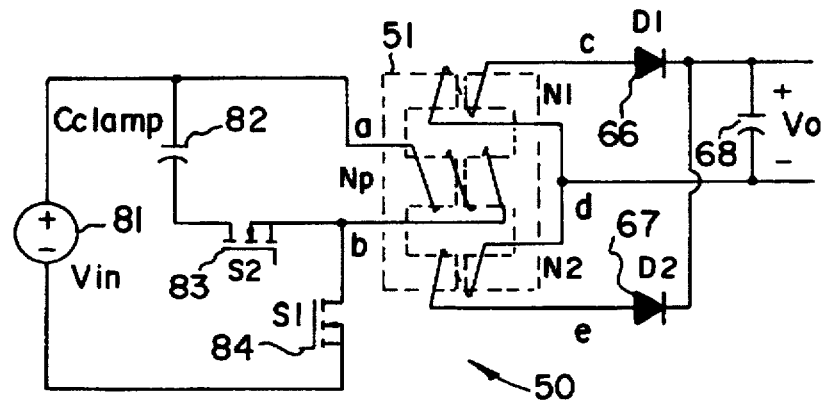

FIG. 3(b) is a diagrammatic view of the application of the new integrated magnetic structure on a forward derived converter.

Figure 3C:
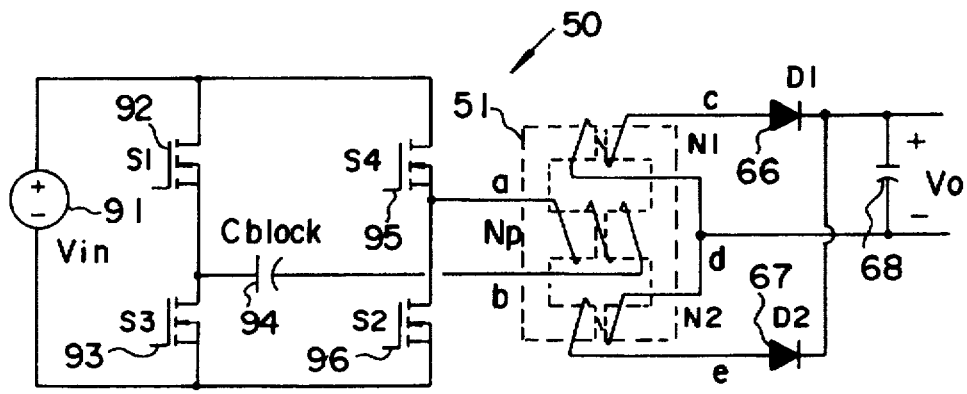

FIG. 3(c) is a diagrammatic view of the application of the new integrated magnetic structure on a full bridge derived converter.

Figure 3D:
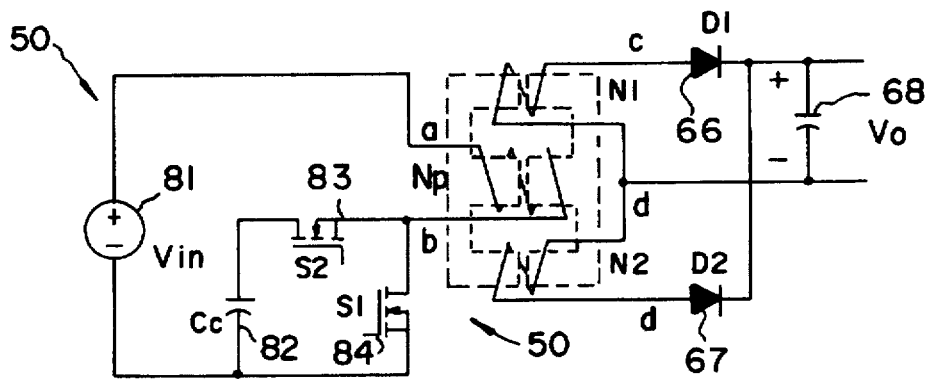

FIG. 3(d) is a diagrammatic view of the second application of the new integrated magnetic structure on a forward derived converter.

Figure 3E:
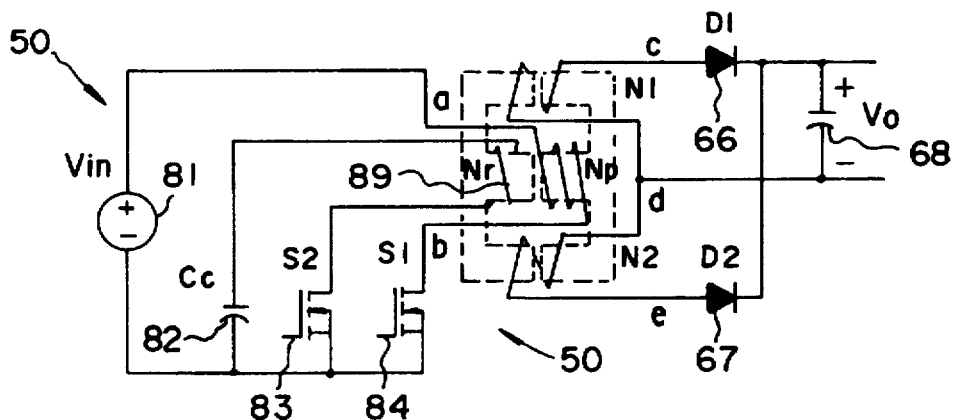

FIG. 3(e) is a diagrammatic view of the third application of the new integrated magnetic structure on a forward derived converter utilizing an additional winding.

Figure 4A:
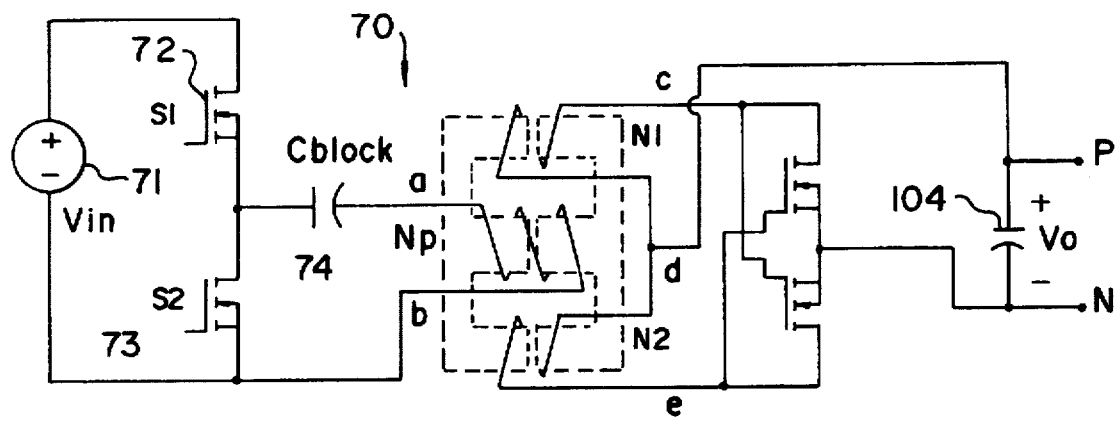

FIG. 4(a) is a diagrammatic view of the new converter employing self-driven synchronous rectifiers (SSRs) on a half bridge derived converter.

Figure 4B:
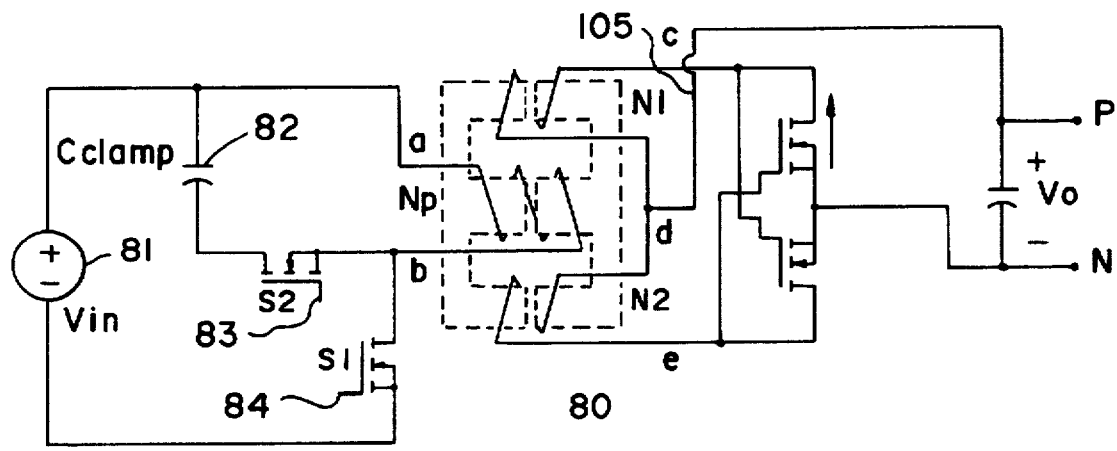

FIG. 4(b) is a diagrammatic view of the new converter employing SSRs on a forward derived converter.

FIG. 4(c) is a diagrammatic view of the new converter employing SSRs on a full-bridge derived converter.

FIG. 4(d) is a diagrammatic view of the second application of the new converter employing the SSRs on a forward derived converter.

FIG. 4(e) is a diagrammatic view of the third application of the new converter employing the SSRs on a forward derived converter and utilizing an additional winding.

FIG. 5(a) shows an operational diagram of the Mode 1 operation of the new rectifier circuit of FIG. 2(c).

Figure 5B:
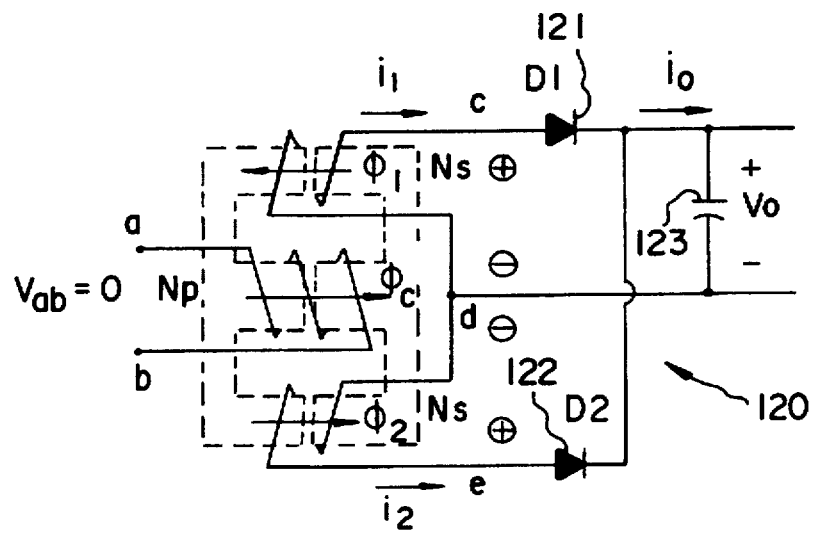

FIG. 5(b) shows an operational diagram of the Mode 2 operation of the new rectifier circuit of FIG. 2(c).

Figure 5C:
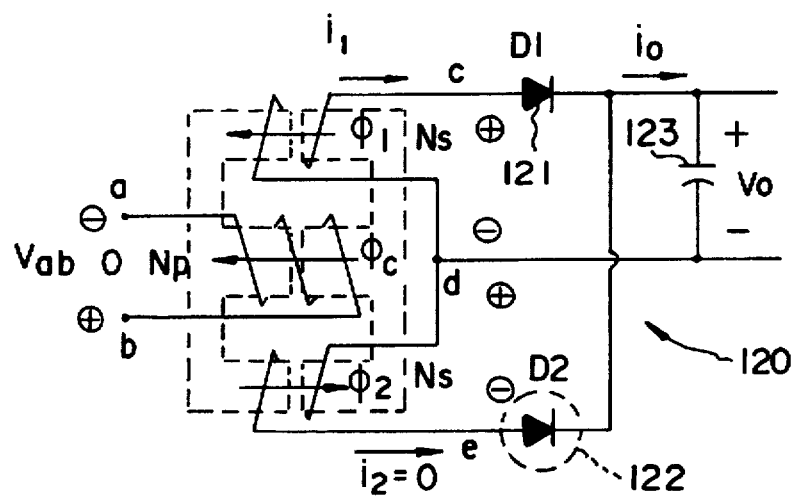

FIG. 5(c) shows an operational diagram of the Mode 3 operation of the new rectifier circuit of FIG. 2(c).

Figure 5D:
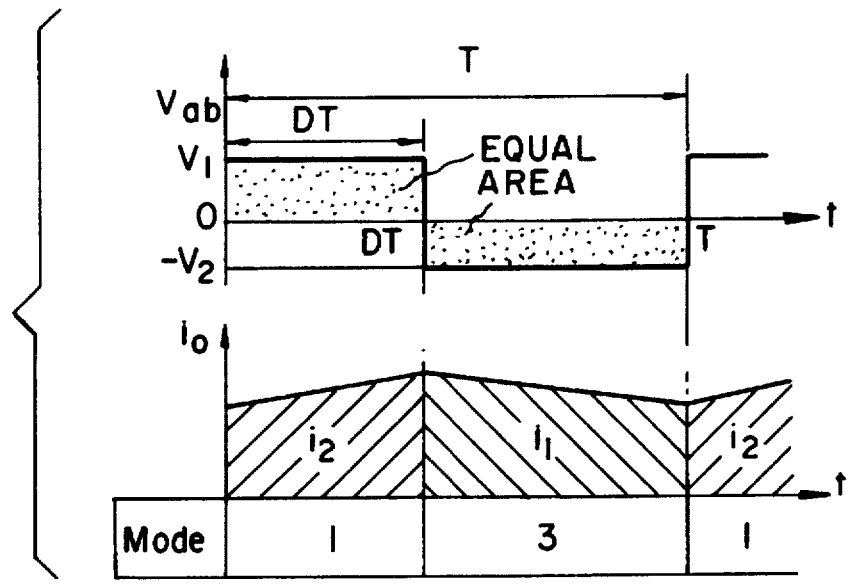
Figure 5E:
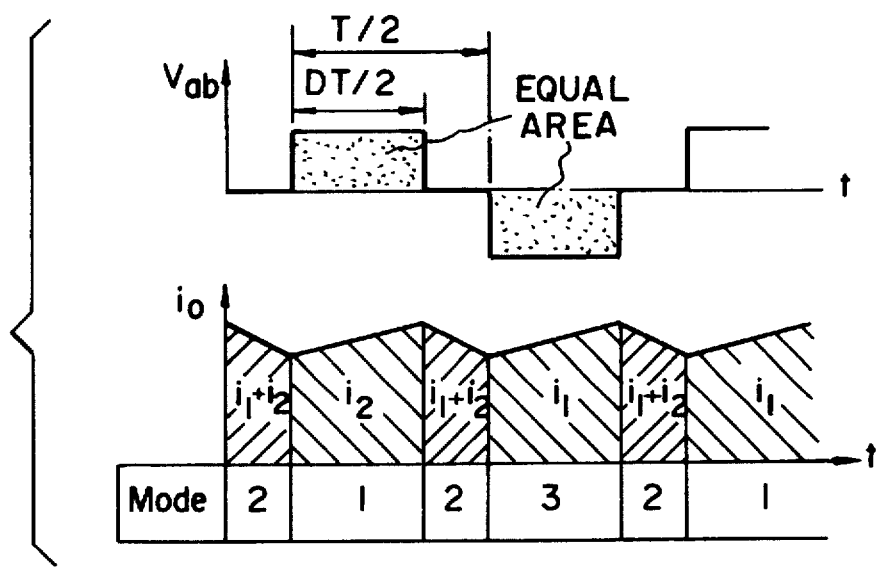

FIG. 5(d) is a plot of the operational waveforms with only modes 1 and 3 involved. FIG. 5(e) is a plot of the operational waveforms with modes 1, 2 and 3 involved.

Figure 6A:
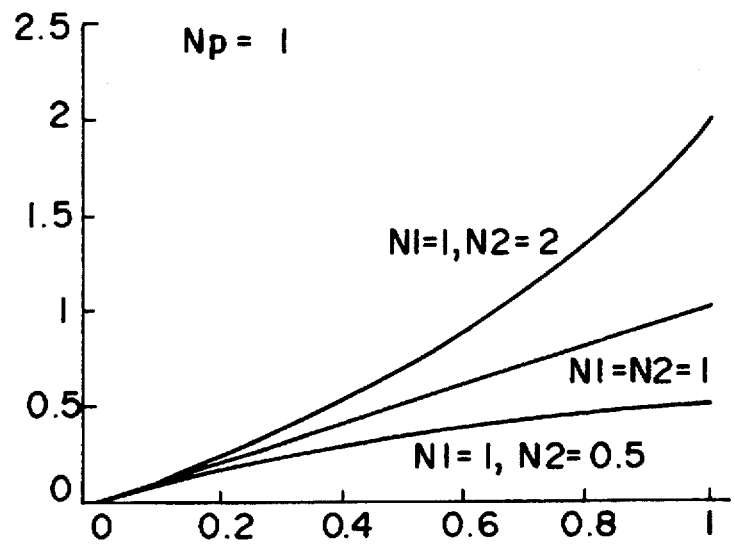
Figure 6B:
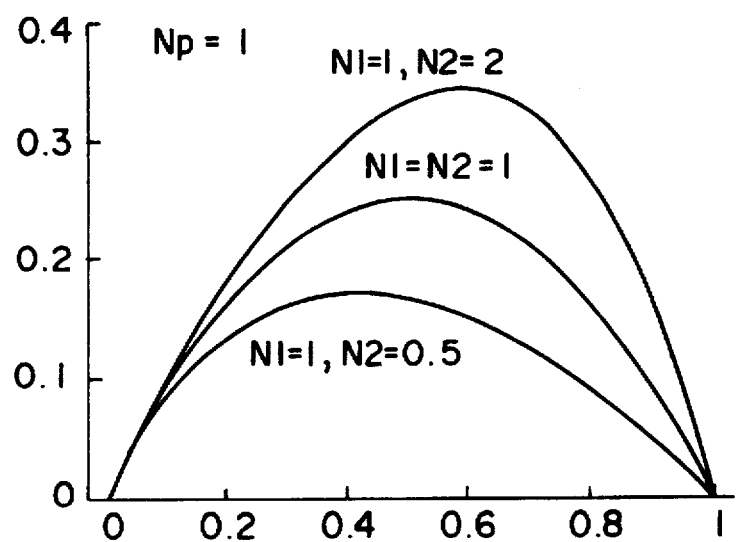

FIG. 6(a) is a graph depicting the DC gains of the forward derived converter, and FIG. 6(b) is a graph depicting the DC gains of the half-bridge derived converter.

Figure 7A:
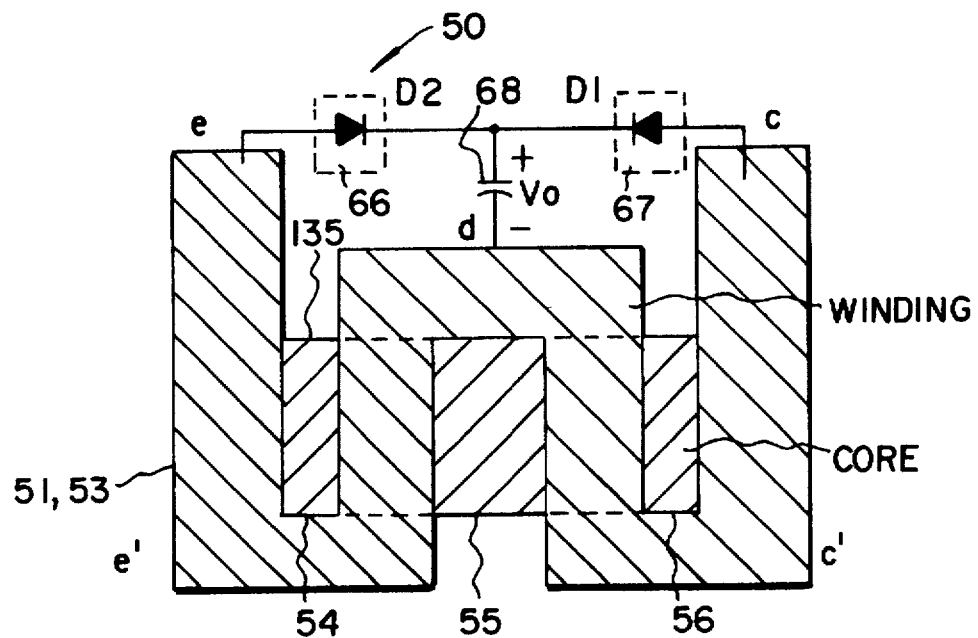

FIG. 7(a) is a first configuration view of the new rectifier circuit with single-turn secondary-side winding.

Figure 7B:
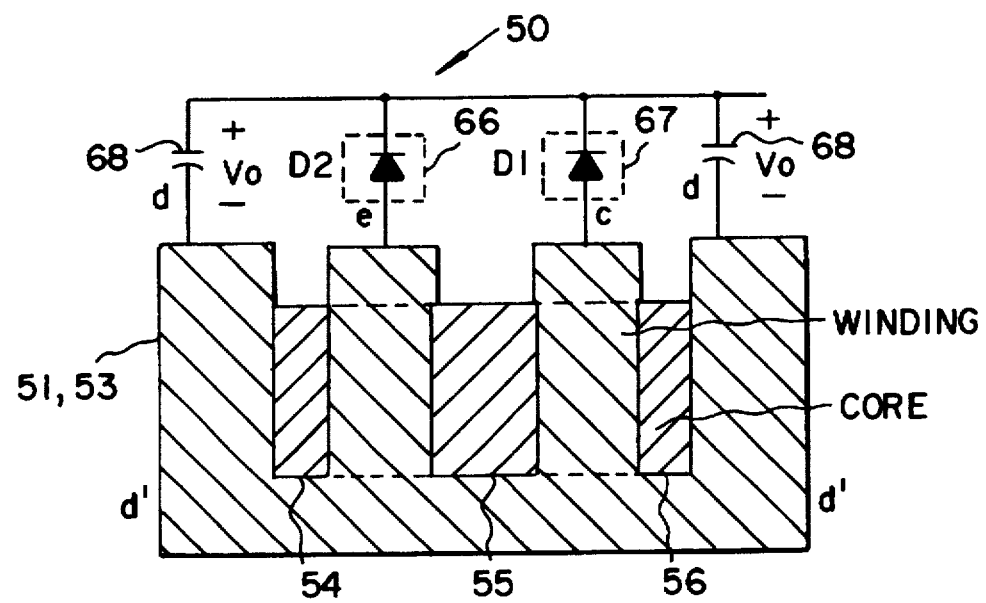

FIG. 7(b) is a second configuration view of the new rectifier circuit with single-turn secondary-side winding.

Figure 7C:
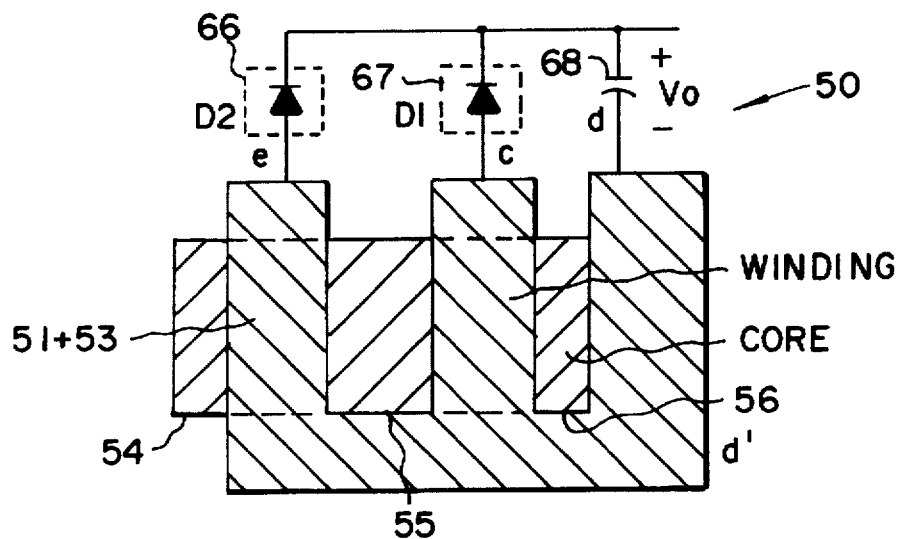

FIG. 7(c) is a third configuration view of the new rectifier circuit with single-turn secondary-side winding.

Figure 7D:
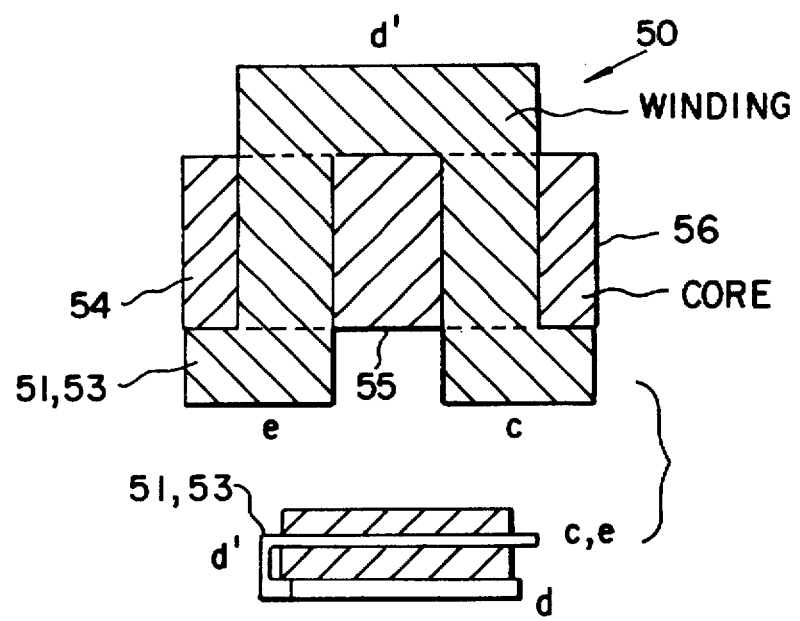

FIG. 7(d) is a top and side view of the new rectifier circuit with single-turn secondary-side winding.

Figure 8:
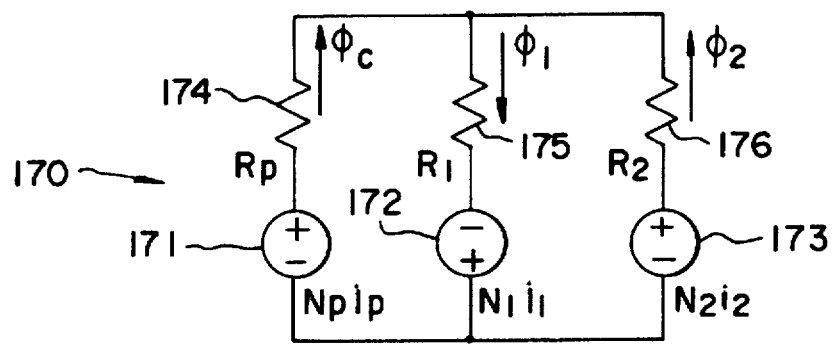
Figure 9:
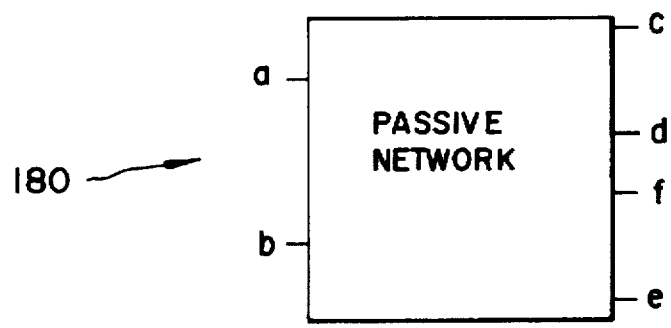

FIG. 8 is a magnetic reluctance circuit of the magnetic structure shown in FIG. 2(a), and FIG. 9 shows a three port electrical network for the magnetic structure in FIG. 2(a).

4

DETAILED DESCRIPTION OF THE DRAWINGS

FIGS. 1(a) and 1(b) show the circuit diagram and typical waveform of the typical current doubler rectifier circuit. The individual inductor can carry a relatively high ripple current but the polarities of the two ripple currents are opposite. Consequently, the total ripple current flowing into the filter capacitor is greatly decreased. With the load shared between the two inductors each inductor size is greatly reduced. With proper design, the overall filter size of the current doubler including the two inductors and one capacitance is smaller than that of the simple LC filter which consists of one inductor and one capacitance. Prior art devices like that shown in FIG. 1(a) have a voltage source 1, power switches 2, 3, capacitors 4, 5, diodes 6, 7, isolation transformer with three windings 8, 9, 11 and two filtering inductors 12, 13. Rectifying diodes 14, 15 act upon that output in conjunction with capacitor 16 which controls the output of the circuit.

Figure 1C:
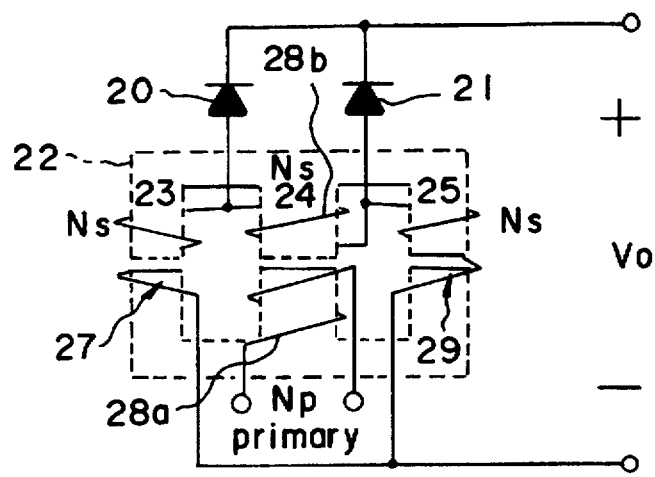
FIG. 1(c) shows an old integrated magnetic structure.
Figure 1D:
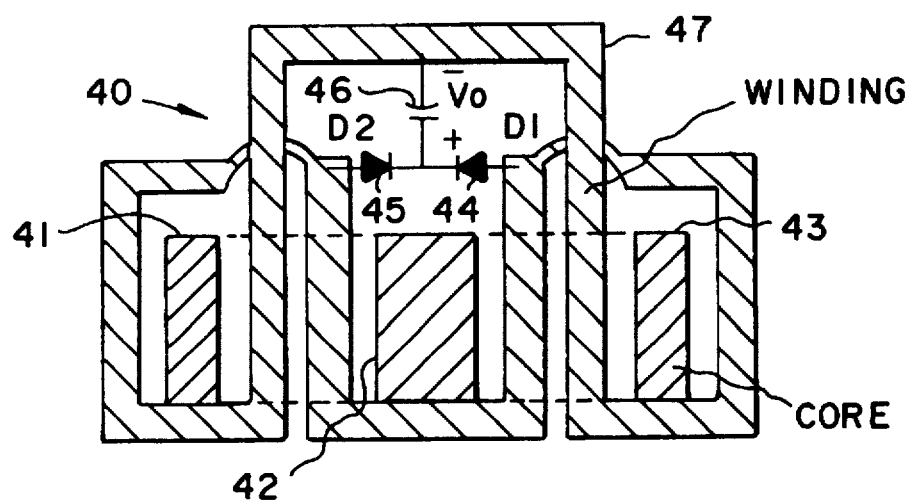
FIG. 1(d) shows the secondary-side circuit layout configuration of the old integrated magnetic circuit of FIG. 1(c) for a single turn transformer secondary winding and inductor windings.

The new magnetic structure 50 is implemented on a core as shown in FIG. 2(a) which has three posts 54, 55, 56. Three windings 51, 52, 53 are the core posts 54, 55, 56, respectively. Two of these windings 51, 53 share one termination. It is noted that winding 52 which is connected to the primary side can be placed on any of the core posts and windings 51, 53 will thereby be placed on the remaining two posts. In the following text, for ease of discussion, it is assumed that winding 52 is placed on the center post and windings 51, 53 are placed on the outer legs of the core. The prior art core and winding is shown in FIG. 1(c) comprising two windings 28a, 28b on center post 24 and two windings 27, 29 on outer leg posts 23, 25. Diodes 20 and 21 complete the system. FIG. 1(d) shows a prior art induction layout with the core sections 41, 42 and 43 surrounded by winding 47 which acts with capacitance 46 and diodes 44, 45 to form the system.

The equivalent electrical circuit 60 is derived as shown in FIG. 2(b). To arrive at the electrical circuit model assume, referring to FIGS. 8 and 9, that the leakage flux through the air is negligible the equivalent magnetic reluctance circuit 170 is shown in FIG. 8. It has reluctances 174, 175 and 176 and exciting sources 171, 172 and 173. To identify the "black box" shown in FIG. 9, only one winding is excited by the source with the other two windings open. With windings CD and EF open, winding AB is excited by ip. The flux flowing through the center post of E core is found to be $$\phi_c = \frac{N_p i_p}{R_c + R_1 // R_2} , \quad (A1)$$

where Np and ip are the turns number of the center post winding and the current on the winding respectively; is the flux in the center post, the symbol "//" represents the parallel combination of two impedances; Rc, R1 and R2 are the magnetic reluctance of the center post and the outer legs, which are defined as:

$$R_1 = \frac{l_1}{\mu_0 A_1} + \frac{l_{1m}}{\mu_r \mu_0 A_1} + \frac{l_{1b}}{\mu_r \mu_0 A_{1b}} , \quad (A2)$$

$$R_c = \frac{l_c}{\mu_0 A_c} + \frac{l_{cm}}{\mu_r \mu_0 A_c} , \quad (A3)$$

and $$R_2 = \frac{l_2}{\mu_0 A_2} + \frac{l_{2m}}{\mu_r \mu_0 A_2} + \frac{l_{2b}}{\mu_r \mu_0 A_{2b}} , \quad (A4)$$

where li and Ai are the magnetic lengths and effective cross sectional areas defined in FIG. 2(a), $u_o$ is the permeability of the air and $u_r$ is the relative permeability of the magnetic material. Thus the equivalent inductance across winding AB is expressed as:

$$L_{ab} = \frac{N_p \frac{d\phi_c}{dt}}{\frac{di_p}{dt}}. \tag{A5}$$

Substituting Eq. (A1) to Eq. (A5) yields $$L_{ab} = \frac{N_p^2}{R_c + R_1//R_2}. \tag{A6}$$

If defining $$L_p = \frac{N_p^2}{R_c}, \tag{A7}$$

$$L_1 = \frac{N_1^2}{R_1}, \tag{A8}$$

and $$L_2 = \frac{N_2^2}{R_2}, \tag{A9}$$

$L_{ab}$ can be written as $$L_{ab} = L_p // \left[ \left(\frac{N_p}{N_1}\right)^2 L_1 + \left(\frac{N_p}{N_2}\right)^2 L_2 \right], \tag{A10}$$

where N1 and N2 are the number of turns of windings CD and DE respectively. Allowing Lcd to be the inductance across winding CD with the other two windings open and Lef to be the inductance across winding EF with the other two windings open, the inductances can be expressed as $$L_{cb} = L_1 // \left[ \left(\frac{N_1}{N_p}\right)^2 L_p + \left(\frac{N_1}{N_2}\right)^2 L_2 \right], \tag{A11}$$

and $$L_{ef} = L_2 // \left[ \left(\frac{N_2}{N_1}\right)^2 L_1 + \left(\frac{N_2}{N_p}\right)^2 L_p \right]. \tag{A12}$$

Therefore, the "blackbox" in FIG. 9 can be identified with the assistance of equations (A10–A12). FIG. 2(b) is illustrative of one of the possible equivalent electrical circuits. Circuit 60 is shown with the equivalent isolation transformer 62 and 63, and the equivalent inductors Lp (61), L1 (64) and L2 (65) configured for N1=N2 and N1=N2=Ns. FIG. 2(c) shows the new rectifier circuit 30 with new magnetic structure 50, diodes 66 and 67, and capacitance 68. If one were to combine the circuits of FIG. 2(b) and 2(c) the result would be the same rectifier circuit as shown in FIG. 1(a), i. e. the conventional current doubter circuit if N1=N2=Ns. L1 and L2 and Lp in the equivalent circuit shown in FIG. 2(b) are determined by the following computation:

$$L_p = \frac{N_p^2}{R_c}, \tag{1}$$

$$L_1 = \frac{N_1^2}{R_1}, \tag{2}$$

and $$L_2 = \frac{N_2^2}{R_2}, \tag{3}$$

where N1 and N2 are the number designating turns of windings CD and DE respectively. Rc, R1 and R2 are the magnetic reluctances of the center post and the outer legs. It is assumed that the high permeability material such as ferrite is used. If the positive directions of the variable are defined as that as that shown in FIG. 2(c) then $$i_1 + i_2 = i_o. \tag{4}$$

By applying Ampere's Law to the magnetic structure shown in FIG. 2(a), we have $$H_l l_1 + H_{1m} l_{1m} + H_{1b} l_{1b} + H_2 l_{2m} + H_{2b} l_{2b} = N_1 i_1 + N_2 i_2, \tag{5}$$

$$H_1 l_1 + H_{1m} l_{1m} + H_{1b} l_{1b} + H_{1b} l_{1b} + H_c l_c + H_{cm} l_{cm} = N_1 i_1 + N_p i_p, \tag{6}$$

$$H_2 l_2 + H_{2m} l_{2m} + H_{2b} l_{2b} - H_{cm} l_{cm} = N_2 i_2 - N_p i_p. \tag{7}$$

where Hi is the magnetic field intensity, li is the magnetic length defined in FIG. 2(a). Since the permeability of the core material and the air is usually thousands of multiples and the physical dimensions difference of each portion of the core is usually less than one hundred multiple, the magnetic field intensity in the air gap is much larger than that inside the core. Therefore, equations (5) through (7) can be simplified to $$H_1 l_1 + H_2 l_2 = N_1 i_1 + N_2 i_2, \tag{8}$$

$$H_1 l_1 + H_c l_c = N_1 i_1 + N_1 i_1 + N_p i_p, \tag{9}$$

$$H_2 l_2 - H_c l_c = N_2 i_2 - N_p i_p. \tag{10}$$

It can be seen from equations (4) through (10) that the two outer leg windings together carry the load current and the energy stored in the outer legs is transferred to the load while the energy stored in the center post is not transferred to the load and circulates in the primary side. The current corresponding to the circulating energy is called the magnetizing current which usually helps zero voltage switching of the primary switches but increases the primary current stress as well.

The steady state operation of the proposed integrated magnetic circuit consists of three operation modes depending on the voltage being applied on winding AB.

FIG. 2(d) shows the circuit 30 of FIG. 2(c) with the diodes 66, 67 wired in reverse which provides for reverse polarity operation. FIGS. 2(e) and 2(f) show power switches 58 and 59 substituted for the sensing function of the diodes 66, 67 with both polarity aspects shown in the respective figures. FIG. 2(g) shows the power switches 58, 59 arranged so as to provide a self-driven converter 30.

In mode 1, as shown in FIG. 5(a) the voltage applied is positive. The system 120 induced flux in the center post forces the flux in outer leg 1, $\phi_1$ to increase and the flux in outer leg 2,$\phi_2$ to decrease. According to Lenz's Law then, Vcd is negative and Ved is positive. D1 (121) blocks and D2 (122) conducts the full load current, io. Therefore, $$i_2 = i_o, \tag{11}$$

$$H_1 l_1 + H_2 l_2 = N_2 i_2 N_2 i_o, \tag{12}$$

and $$H_1 l_1 + H_c l_c = N_p i_p. \tag{13}$$

From Equations (12) and (13) it can be seen that winding AB carries the sum of "magnetizing current" and a portion of the reflected load current. The term Hc lc in equation (13) stands for the "magnetizing current" of the transformer.

In mode 2 when N1=N2=Ns, as in FIG. 5(b), there is no voltage applied on winding AB in system 120. The flux in the center post remains constant. This state requires that the flux changes in the outer legs 1 and 2 be identical. Therefore, winding CD and DE should sustain the same volt-per-turn. Meanwhile, in order to maintain the flux continuity in the outer legs and base plates of E core at least one of either D1 (121) or D2 (122) has to conduct to form io.

Therefore, both D1 (121) and D2 (122) conduct. Windings CD and DE together carry the load current, and the current distribution between these two windings is determined by the parasitic components in the circuit. It is noted that this mode only exists if N1=N2=Ns. If N1 and N2 are different it is impossible to obtain zero flux change in the center post no matter which diode conducts or whether both do so. This can be easily seen from the equivalent circuit. In practice, there exists the current commutation interval when both rectifiers conduct. If N1 and N2 are different the voltage on winding AB is nonzero.

Mode 3, as shown in FIG. 5(c) has a negative voltage applied on winding AB in system 120. The induced flux in the center post forces $\phi 1$, to decrease and $\phi 2$ to increase. Correspondingly, Vcd is positive and Ved is negative. D2 (122) blocks while D1 (121) conducts the fill load current io. As in the previous models, the following equations can be arrived at;

$$i_1 = i_o, \tag{14}$$

$$H_1 l_1 + H_2 l_2 = N_1 i_1 = N_1 i_o, \tag{15}$$

and $$H_2 l_2 - H_c l_c = -N_p i_p. \tag{16}$$

Winding AB carries the magnetizing current and one portion of the reflected load current.

On average, the flux in outer leg 1 increases in mode 1 and decreases in modes 2 and 3. Le., the outer leg 1 implements the filtering function of L1 in the equivalent doubler circuit. Similarly, the outer leg 2 implements the filtering function of L2 in the equivalent current doubler circuit. The energy stored in the outer legs contributes to the load current. One important point that distinguishes the instant invention from the prior attempts at solving the problem is that windings CD and DE serve as the inductor winding and transformer secondary winding simultaneously. Therefore, the new structure eliminates the need for a transformer secondary winding which is required in conventional circuit design and in the background art.

From the foregoing analysis is seen that the proposed magnetic structure completely fulfills the functions of the conventional doubler circuit. Therefore the conventional doubler circuit can be replaced by this proposed integrated magnetic structure. When N1 does not equal N2, however, the operation of mode 2 is not available. The difference between N1 and N2 will result in a change of the characteristics of the converter which exhibits the benefits in certain special applications. None of these features of operation are found in the prior art.

FIG. 3(a) shows the half-bridge circuit 50 using the proposed integrated magnetic technique there is only one magnetic component, one core and three windings in the circuit. It has power switches 72 and 73, dc blocking capacitor 74, magnetic component 51, diodes 66 and 67 and capacitor 68. FIG. 3(b) shows the invention in a forward derived converter 50 having power source 81, capacitor 82, power switches 83 and 84, magnetic component 51, diodes 66 and 67 and capacitor 68. FIG. 3(c) shows the invention configured as a full bridge derived converter 50 with power switches 92, 93, 96 and 95, dc blocking capacitor 94, magnetic component 51, diodes 66 and 67 and capacitor 68. FIG. 3(d) shows a forward derived converter similar to that shown in FIG. 3(b) with the new integrated magnetic structure and a circuit similar to that of FIG. 3(b). FIG. 3(e) shows a forward derived converter similar to that shown in FIGS. 3(b) and 3(d) but utilizing an additional winding 89.

The new circuit eliminates the necessity of two cores and one power winding compared to the conventional circuit shown in FIG. 1(a). It is noted that one primary winding shown in FIG. 1(a) is the clamping winding. If an asymmetrical duty cycle control is adopted, this winding can be eliminated. The circuit can be much simpler, therefore, in the discussion following, it is assumed that the asymmetrical duty cycle control is adopted for both conventional and new half-bridge converters, the primary voltage waveform of the half-bridge converter is shown in FIG. 5(d). By extending the new integrated magnetic structure approach to forward and full-bridge converters, the new converters are realized as configured in FIGS. 3(b) and 3(c). In the following discussion, it is assumed that the primary waveform of the new forward converter is shown in FIG. 5(d) and that of the full bridge converter is shown in FIG. 5(e).

When N1=N2=Ns, the equivalent circuits of the new converters are exactly the same as their conventional counterparts. Therefore, their dc characteristics are the same. Based upon the assumptions of primary voltage waveforms, the dc gain for the new forward converter and full bridge converter is $$M = \frac{V_o}{V_{in}} = D \frac{N_s}{N_p} ; \tag{17}$$

the dc gain for the new half bridge converter is $$M = \frac{V_o}{V_{in}} = D(1-D) \frac{N_s}{N_p} . \tag{18}$$

The dc gain of the new half bridge converter with N1=N2 is nonlinear. The duty cycle range must be either 0–50% or 50%–100%. When the input line range is wide, the duty cycle range becomes very wide. At high line, the duty cycle is close to 0 or to 100%. One of the secondary rectifiers has to sustain very high voltage stress. At low line, the duty cycle is close to 0.5, the conversion gain changes very slowly, the dynamic response is poor. So, like the conventional half-bridge converter, the new half-bridge converter with N1=N2 is only suitable for well regulated input.

When N1 differs from N2, the operation only consists of modes 1 and 3. In mode 1 or interval [0, DT], the voltage applied on winding CD is $$V_{cd} = -\left( V_1 \frac{N_1}{N_p} - V_o \frac{N_1}{N_2} \right), \tag{19}$$

where V1 is the positive voltage applied on winding AB, as shown in FIG. 5(d). In mode 3 or [DT, T], the voltage applied on winding CD is $$V_{cd} = V_o. \tag{20}$$

The volt-second balance on outer leg 1 of the core gives $$-\left( V_1 \frac{N_1}{N_p} - V_o \frac{N_1}{N_2} \right) D + V_o (1-D) = 0, \tag{21}$$

or $$V_o = V_1 \frac{N_1}{N_p} \left( \frac{D}{1 + \left( \frac{N_1}{N_2} - 1 \right) D} \right). \tag{22}$$

In the forward derived converter, V1 equals Vin. Therefore, the dc gain for this converter becomes $$M = \frac{V_o}{V_{in}} = \frac{N_1}{N_p} \left( \frac{D}{1 + \left(\frac{N_1}{N_2} - 1\right)D} \right). \quad (23)$$

In the half-bridge derived converter, V1 equals Vin (I-D). The dc gain for this converter thus becomes $$M = \frac{V_o}{V_{in}} = \frac{N_1}{N_p} \left( \frac{D(1-D)}{1 + \left(\frac{N_1}{N_2} - 1\right)D} \right). \quad (24)$$

As seen from equations (23) and (24), the difference between N1 and N2 introduces the nonlinear term in the voltage conversion gain. FIG. 6 plots the conversion gains for each converter for the cases N1>N2, N1=N2, and N1<N2, assuming that $N_p$ and $N_1$ are the same for all cases.

If N1=N2=Ns, equations (23) and (24) become equations (17) and (18) respectively. The dc gains are the same as those of the conventional converters. If N1>N2, the dc gain will be smaller than those of the conventional converters at the same duty cycle. If N1<N2, the conversion gains are larger than those of the conventional converters at the same duty cycle. This provides a narrower duty cycle range than the conventional converters for a given input voltage range. The conventional half-bridge converter with asymmetrical duty cycle control can operate in at most a 50% duty range and exhibit poor dynamic response when the duty cycle approaches 50%, however, the new half-bridge converter with N1<N2 can operate at higher than 50% duty cycle and the dynamic performance at 50% duty cycle is also improved.

Due to the change in the duty cycle range because of the difference between N1 and N2 the primary switches in the forward converter will suffer different voltage stress compared to the conventional converters or the case with N1=N2.

The voltage stress on the primary switches of the new forward derived converter can be expressed as $$V_{ds} = \frac{V_{in}}{1-D} = V_o \frac{N_p}{N_s} \left[ \frac{1 + \left(\frac{N_1}{N_2} - 1\right)D}{D(1-D)} \right]. \quad (25)$$

When $N_1 = N_2$, the voltage stress of the primary switches becomes $$V_{ds} = \frac{V_{in}}{1-D} = V_o \frac{N_p}{N_s} \frac{1}{D(1-D)}, \quad (26)$$

which is the same as that of the conventional converter. When N1<N2, according to equations (25) and (26), the voltage stress of the primary switches in the new converter is lower than that in the conventional converter for the same duty cycle range. Also, when N1<N2, the duty cycle range for a given input range is narrower than that of the conventional converter according to equations (17) and (23). Therefore, the proper design of N1<N2 helps reduce the voltage stress of the primary switches in the new converters. Although the voltage stress on the rectifiers is not directly influenced by the choice of N1 or N2, it is affected by the duty cycle range which is a function of the choice of N1 and N2. When N1<N2, the voltage stress on the secondary rectifier can be reduced if the duty cycle is properly narrowed. The voltage stresses on the rectifiers D1 and D2 are expressed as $$V_{d1} = \frac{V_o}{D}, \quad (27)$$

and $$V_{d2} = \frac{V_o}{1-D}. \quad (28)$$

The following examples explain these special benefits with the introduction of N1<N2. Example one involves a typical half-bridge current doubler circuit with a 36–72 volt input and 3.3 volt output. In the conventional half-bridge converter it has a duty cycle range of 0.13 to 0.39 with Np=5, N1=N2=2. The maximum allowable duty cycle is 0.5, the dynamic response at low line is poor. The maximum voltage stress on the secondary rectifier is 25 volts. In the new and improved half bridge converter with Np=5, N1=2 and N2=3 it gives a narrower duty cycle range of 0.13–0.29. The maximum allowable duty cycle is about 0.55. The dynamic performance of this design is much better than that of the doubler circuit. Since the duty cycle is at the lower end, Np can be increased to 6. The resulting duty cycle range is 0.15 to 0.39, the voltage stress on the rectifier is reduced to 22 volts.

Example two involves a forward derived current doubler circuit with a 12–40 volt input and 5 volt output. The conventional forward converter has the duty cycle range of 0.25 to 0.84 with Np=4, N=N2=2. The voltage stress of the primary switches is at least 75 volts. The safety margin is small if the 100 volt devices are adopted. The higher voltage rating devices have to be employed increasing the cost and the conduction loss, because the on resistance of the device increases with voltage rating. The voltage stress on the secondary rectifier is 31 volts. Considering the switching transient time and dynamic response, 0.84 duty cycle is usually impractical. Therefore, Np has to be decreased to 3 and the resulting duty cycle range is 0.19 to 0.63. The voltage stress on the primary switch is 50 volts, voltage stress on the secondary rectifier 27 volts. The primary current stress increases significantly. The new forward derived converter with Np=4, N1=2 and N2=3 gives a duty cycle range of 0, 23 to 0.65. The maximum voltage stress of the primary switches is only about 52 volts. The 100 volt device should be able to handle this converter. The voltage stress on the rectifier is also reduced to 22 volts. If Np is increased to 5 the resulting duty cycle range is 0.28 to 0.77 corresponding to about 56 volts stress on the primary switches and still 22 volt stress on the secondary side, the 100 volt device can still be adopted. Compared to example one with Np=3, this design has lower stress on both primary and secondary semiconductor devices. In addition the primary conduction loss can be lower.

For the low output voltage applications, the synchronous rectifiers are employed to reduce the voltage drop on the rectifiers. FIGS. 4(a),(b) and(c) show the new converters 70, 80 and 90 employing self-driven synchronous rectifiers. (SSR). In the low voltage high current application, a single turn for every secondary-side winding (including the inductor winding) is usually preferred. The secondary-side circuit layout is simplified by adopting the new integrated magnetic technique. The secondary-side layout configurations are shown in FIG. 7. Compared to the prior art shown in FIG. 1(d) there is no transformer secondary winding in the new layouts, so there is no overlap between secondary-side windings. Only a single layer winding is necessary. The cost is accordingly reduced and all the improved winding patterns can be adopted to PCBs easily.

In converter 70 power switches 101 and 102 are substituted for diodes 76 and 77 and capacitance 104 for 78. In converter 80 power switches 106 and 107 are substituted for diodes 86 and 87 and capacitance 108 for 88. In converter 90 power switches 110, 111 are substituted for diodes 98, 99, respectively, and capacitance 112 for 100. FIG. 4(d) shows a forward derived converter employing SSRs which is similar to FIG. 4(b). FIG. 4(e) shows a forward derived converter similar to that shown in FIGS. 4(b) and 4(d) but utilizing an additional winding 109.

In FIG. 7(a), the layout of the secondary side configuration is directly derived from capacitor 68. M-shaped configuration 50 has core posts 54, 55 and 56 and is patterned after the core and windings shown in FIG. 2(a). There is a winding made up of windings 51 and 53 shown in FIG. 2(a). Primary winding 52 is not shown in FIG. 7(a) nor in FIGS. 7(b), 7(c) or 7(d).

FIG. 7(b) shows a sychronous rectifier configuration 50 with core pieces 54, 55 and 56, windings 51, 53 (shown as integrated), diodes 66 and 67 and two capacitors 68.

FIG. 7(c) shows yet another E-shaped configuration 50 of the Schottky rectifier having core sections 54, 55 and 56, integrated windings 51, 53, diodes 66, 67 and capacitor 68. In FIG. 7(d) there is shown a configuration 50 having the cores 54, 55 and 56 and integrated windings 51, 53. Portions dd' are underneath core pieces 55 and 56 only. In FIGS. 7(b, c and d) the common part of the two windings, dd' is located outside of the core so they can be formed by the circuit trace. Since winding portion dd' only carrys a very small ac current, the ac loss of the dd' portion is much lower compared to the ac loss of cc' and ee' in FIG. 7(a). This is the first advantage of these three layouts. The second advantage is that the loop for the rectifier current commutation is minimized. Therefore, the inductance in the commutation loop is minimized. The commutation time is shortened and the effective duty cycle increases. The parasitic ringing on the rectifiers is also alleviated. In addition, in FIG. 7(a) and the prior art as shown in FIG. 1(d) one of the output rails is surrounded by the other traces. In order to connect this rail to the output terminal, a jumper is needed. In contrast, there is no such problem in FIG. 7(b to d). The layout in FIG. 7(c) yields a much smaller footprint than that in FIG. 7(b). Since the winding portion dd' in FIG. 7(d) runs under the core, the layout in FIG. 7(d) gives the smallest footprint.

As shown in equations (1 to 3) the individual inductance is solely determined by the magnetic reluctance which is further decided by the permeability and physical dimensions of the corresponding leg. The proper design of the parameters of each individual leg will yield an optimal result. The flux in each leg of the core is the sum of the dc bias and the ac swing. To prevent the core or part of the core from saturation, the proper air gap is needed in each leg if a ferrite core is employed, the primary side magnetizing current should be minimized in order to reduce the conduction loss. Since the equivalent magnetizing inductance seen from the primary side is determined by the parallel combination of Lp and (L1+L2), the increase in each inductance, especially Lp, can help reduce the amplitude of the primary side magnetizing current.

One should note that winding AB (52), which is connected to the input side, can be placed on any core post besides the center post and windings CD (51) and DE (53) can hence be located on the remaining core posts. This can be easily derived from the symmetry of the magnetic reluctance circuit shown in FIG. 8.

Having described in detail the various specifics and applications of the invention, it will be obvious to those of ordinary skill in the art that many changes and modifications can be made thereto without departing from the scope of the appended claims.

I claim:

1. A forward derived high density dc/dc power converter with a simple layout design and giving overall superior performance at lower cost than similar converters, said converter comprising single magnetic core means with three posts, one post having a primary-side winding thereon and said two other posts each having secondary-side windings thereon, said secondary side windings having a different number of winding turns thereon, semiconductor and capacitance circuit means connected to said secondary-side windings and adapted to act both as inductor windings and transformer secondary windings to produce an output of said converter, and input circuit means connected to said primary-side winding in a forward type arrangement and causing it to perform as a forward derived converter.

2. A converter as in claim 1 wherein the turns number of secondary-side windings is different from one another thereby reducing voltage stress on the semiconductor devices on both secondary and primary sides and increasing the input voltage range.

3. A converter as in claim 1 and including additional output circuitry which allows the converter to perform as a self driven synchronous rectifier.

4. A half-bridge derived high density dc/dc power converter with a simple layout design and giving overall superior performance at a lower cost than similar converters, said converter comprising single magnetic core means with three posts, one post with a primary-side winding thereon and the two other posts having secondary-side windings thereon, said secondary windings having a different number of winding turns thereon, semiconductor and capacitance means connected to said secondary-side windings and acting as both an inductor winding and a transformer secondary winding to produce an output to said converter, and input circuit means connected to said primary-side winding means in a half bridge arrangement.

5. A converter as in claim 4 including additional output circuitry which allows the converter to function as a self driven synchronous rectifier.

6. A converter as in claim 4 wherein the turns number of the secondary-side winding is different wherein lower voltage stress is produced on the semiconductor devices in the output circuit and a wider input voltage range is obtained.

7. An improved isolated rectifier circuit adapted to half-bridge and forward topologies, said circuit comprising two rectifying devices, each having two nodes, an electrical charge storing element with two nodes, and an improved integrated magnetic component means, said magnetic component means having primary and secondary sides and comprising a magnetic core element, said element having three core posts, three windings, one of said windings on one of said core posts and connected to the primary side of said magnetic component means and receiving an ac driving voltage waveform, said two other windings each on one of said other core posts and connected to said secondary side of said magnetic component means and sharing a common termination which is connected to one node of said electrical charge storing element, said secondary side windings having a different number of winding turns, each of the unshared termination of the two secondary-side windings connected, respectively, to one node of a rectifying device, the remaining nodes of said rectifying devices connected to the remaining node of the charge storing element, and circuit output terminals connected to the respective nodes of said charge storage element to form the circuit.

8. A circuit as in claim 7 wherein said charge storing element comprises a capacitor.

9. A circuit as in claim 7 wherein said rectifying devices are diodes.

10. A circuit as in claim 7 wherein said rectifying devices are FET transistors.

11. A circuit as in claim 7 wherein said rectifying devices are implemented by MOSFET devices which can be driven by the voltage waveforms derived from the windings on the magnetic component.

12. A circuit as in claim 7 wherein the secondary-side winding is a single-turn and is "E" shaped with two adjacent tines of "E" passing through two apertures in an E-core and the third tine located outside of said E-core, and wherein the current flowing through the winding portions inside the core is pulsating while the current flowing on the winding portion outside of said core is relatively constant.

13. A circuit as in claim 7 wherein said magnetic core element constitutes an E-core, and wherein two single-turn secondary side windings are combined into one winding with three termination means resulting in a low power loss, low material cost and easy packaging, portions of said single-turn windings being located both outside and inside the E-core.

14. A circuit as in claim 13 wherein said secondary windings are single-turn and are forked with four fork tines connecting together on one side of said core and wherein each core post is adjacent two tines and the current which flows on the winding portions through the inner portion of said E-core is pulsating while the current flowing on the winding portions outside said core is relatively constant.

15. A circuit as in claim 7 wherein a secondary side windings are single-turn and are "W" shaped and said core post is adjacent two portions of said secondary windings and the current in the windings on said outer leg posts is pulsating.

* * * * *